United States Patent
Martin et al.

(10) Patent No.: US 10,633,299 B2
(45) Date of Patent: Apr. 28, 2020

(54) TIME-RELEASE MOLYBDENUM FERTILIZER

(71) Applicant: Compass Minerals USA Inc., Overland Park, KS (US)

(72) Inventors: Elliott Martin, Kansas City, MO (US); Robert A. Geiger, Olathe, KS (US); Mark Goodwin, Kelowna (CA)

(73) Assignee: Compass Minerals USA Inc., Overland Park, KS (US)

( * ) Notice: Subject to any disclaimer, the term of this patent is extended or adjusted under 35 U.S.C. 154(b) by 0 days.

(21) Appl. No.: 15/959,772

(22) Filed: Apr. 23, 2018

(65) Prior Publication Data

US 2019/0322602 A1 Oct. 24, 2019

(51) Int. Cl.
| | | |
|---|---|---|
| C05G 3/00 | (2020.01) | |
| C05C 5/00 | (2006.01) | |
| C05C 5/04 | (2006.01) | |
| C05D 9/02 | (2006.01) | |
| C05C 1/00 | (2006.01) | |

(52) U.S. Cl.
CPC .............. *C05G 3/0094* (2013.01); *C05C 1/00* (2013.01); *C05C 5/00* (2013.01); *C05C 5/04* (2013.01); *C05D 9/02* (2013.01); *C05G 3/0041* (2013.01); *C05G 3/0082* (2013.01)

(58) Field of Classification Search
None
See application file for complete search history.

(56) References Cited

U.S. PATENT DOCUMENTS

| 3,794,478 | A | * | 2/1974 | Dirksen | ................... C05D 1/02 |
| | | | | | 71/1 |
| 4,007,029 | A | * | 2/1977 | Kenton | ...................... C05C 3/00 |
| | | | | | 71/11 |
| 4,299,613 | A | * | 11/1981 | Cardarelli | ........... A01M 1/2055 |
| | | | | | 47/DIG. 10 |
| 4,319,910 | A | * | 3/1982 | Meyer | ....................... C05C 3/00 |
| | | | | | 71/27 |

(Continued)

FOREIGN PATENT DOCUMENTS

| CN | 1257854 | 6/2000 |
| CN | 1257855 | 6/2000 |

(Continued)

OTHER PUBLICATIONS

Padhi et al., "Effect of Lime Coating and Molybdenum Seed Treatment on Nodulation, Growth and Yield of Different Pulses Grown in Alfisols," Int. J. Curr. Microbiol. App. Sci. (2018) 7(2): 1417-1426.

(Continued)

*Primary Examiner* — Wayne A Langel
(74) *Attorney, Agent, or Firm* — Hovey Williams LLP

(57) ABSTRACT

The present invention provides a system to aid in the time-release of molybdenum in soil. The system comprises a dry, powdered blend of a calcium source, a molybdenum source, and a second source of calcium and/or molybdenum. The blend is preferably coated onto a dry agronomic carrier (e.g., urea) for application to soil. Advantageously, the calcium sources sequentially contribute to making the soil pH more molybdenum-friendly (i.e., the pH is increased) for an extended period of time.

52 Claims, 2 Drawing Sheets

(56) References Cited

U.S. PATENT DOCUMENTS

| | | | |
|---|---|---|---|
| 4,400,374 A * | 8/1983 | Cardarelli | A01M 1/2055 424/486 |
| 4,405,360 A * | 9/1983 | Cardarelli | A01M 1/2055 504/155 |
| 6,383,247 B1 * | 5/2002 | Wiechens | C05D 5/00 71/63 |
| 6,841,515 B2 * | 1/2005 | Burnham | C05D 9/02 424/475 |
| 7,410,522 B2 | 8/2008 | Green | |
| 7,445,657 B2 | 11/2008 | Green | |
| 8,221,515 B2 | 7/2012 | Goodwin | |
| 9,133,065 B2 | 9/2015 | Goodwin et al. | |
| 9,199,883 B2 | 12/2015 | Peacock et al. | |
| 9,321,699 B2 | 4/2016 | Peacock et al. | |
| 9,499,450 B2 | 11/2016 | McIlrath | |
| 9,540,291 B2 | 1/2017 | Wheeler et al. | |
| 2002/0098982 A1 * | 7/2002 | Burnham | C05D 9/02 504/359 |
| 2005/0064001 A1 | 3/2005 | Wiesman et al. | |
| 2005/0115290 A1 | 6/2005 | Sanders et al. | |
| 2005/0138979 A1 | 6/2005 | Minaev | |
| 2008/0051526 A1 | 2/2008 | Yahkind et al. | |
| 2008/0271368 A1 * | 11/2008 | Yamada | C05B 17/00 47/57.6 |
| 2011/0224080 A1 * | 9/2011 | Lelas | C05D 3/02 504/124 |
| 2011/0269627 A1 * | 11/2011 | Lelas | C01F 11/185 504/121 |
| 2013/0219979 A1 * | 8/2013 | Deb | C05G 3/0041 71/27 |
| 2014/0102156 A1 | 4/2014 | Pursell et al. | |
| 2016/0083308 A1 | 3/2016 | Peacock et al. | |
| 2017/0066692 A1 | 3/2017 | Ledoux | |
| 2017/0096377 A1 | 4/2017 | Immelman et al. | |
| 2017/0113978 A1 | 4/2017 | Wheeler et al. | |
| 2018/0162781 A1 * | 6/2018 | Iyer | C05B 7/00 |
| 2019/0127286 A1 * | 5/2019 | Tyree | A01G 31/00 |
| 2019/0161418 A1 * | 5/2019 | Meredith | C05G 3/02 |
| 2019/0308916 A1 * | 10/2019 | Zhang | A01C 21/00 |

FOREIGN PATENT DOCUMENTS

| | | |
|---|---|---|
| CN | 100463882 | 2/2009 |
| WO | 2015132261 | 9/2015 |
| WO | 2015/145221 | 10/2015 |
| WO | 2016/130695 | 8/2016 |
| WO | 2016/141486 | 9/2016 |

OTHER PUBLICATIONS

International Search Report and Written Opinion dated Apr. 26, 2019 in corresponding PCT/US2018/030926 filed May 3, 2018, 11 pages.
Machine Translation of CN100463882, 9 pages.
Machine Translation of CN1257855, 9 pages.
Machine Translation of CN1257854, 9 pages.

* cited by examiner

TIME-RELEASE MOLYBDENUM FERTILIZER

BACKGROUND OF THE INVENTION

Field of the Invention

The present invention is broadly concerned with fertilizers for controllably-releasing molybdenum.

Description of the Prior Art

Molybdenum is an essential micronutrient for plant growth. Molybdenum is utilized by two plant enzymes that are responsible for converting nitrates into nitrites, and then nitrites into ammonia. That ammonia is then used by those plants to synthesize amino acids. Molybdenum is also used to convert inorganic phosphorus to organic phosphorus in plants, and legumes specifically need molybdenum to fix atmospheric nitrogen. Molybdenum uptake from the soil by plants is most efficient at higher pHs (>7) and less efficient at lower pH soils (<7). Farmers who have fields or field areas with low pHs and who also have Molybdenum deficiency do not have any tools that singly address these two soil issues when they occur together.

Furthermore, a current, typical agronomic practice for fertilizing a field with molybdenum is to use large-sized frits or granules that are broadcasted across a field at an application rate of 6-12 oz. per acre. This causes widespread distribution that may have many inches or even feet between granules. This varying distribution reduces the probability that the plants will have the ability to have access to the nutrient. No prior art molybdenum fertilizers have solved this problem, therefore making it a dire need to develop a novel fertilizer that can address these concerns.

This present invention is a new molybdenum fertilizer that addresses both of these issues. First, the invention increases molybdenum availability to plants in a controlled manner for longer time periods regardless of soil pH. Second, it uniformly distributes molybdenum throughout the soil.

SUMMARY OF THE INVENTION

The present invention addresses these problems by providing a fertilizer composition comprising a mixture of:
(I) at least one source of calcium;
(II) at least one source of molybdenum; and
(III) one or both of the following:
  (a) another source of calcium different from the at least one calcium source (I); and/or
  (b) another source of molybdenum different from the at least one molybdenum source (II).

The invention further provides a coated fertilizer product comprising a carrier coated with a fertilizer composition. The fertilizer composition comprises a mixture of:
(I) at least one source of calcium;
(II) at least one source of molybdenum; and
(III) one or both of the following:
  (a) another source of calcium different from the at least one calcium source (I); and/or
  (b) another source of molybdenum different from the at least one molybdenum source (II).

In a further embodiment, the invention provides a molybdenum fertilization method comprising introducing a fertilizer composition into an environment to be fertilized with molybdenum. The fertilizer composition comprises a mixture of:
(I) at least one source of calcium;
(II) at least one source of molybdenum; and
(III) one or both of the following:
  (a) another source of calcium different from the at least one calcium source (I); and/or
  (b) another source of molybdenum different from the at least one molybdenum source (II).

The invention also provides a method of forming a fertilizer composition comprising blending together ingredients comprising:
(I) at least one source of calcium;
(II) at least one source of molybdenum; and
(III) one or both of the following:
  (a) another source of calcium different from the at least one calcium source (I); and/or
  (b) another source of molybdenum different from the at least one molybdenum source (II).

In yet a further embodiment, the invention provides a method of forming a coated fertilizer product comprising applying a fertilizer composition to the outer surface of a carrier. The fertilizer composition comprises a mixture of:
(I) at least one source of calcium;
(II) at least one source of molybdenum; and
(III) one or both of the following:
  (a) another source of calcium different from the at least one calcium source (I); and/or
  (b) another source of molybdenum different from the at least one molybdenum source (II).

DETAILED DESCRIPTION OF THE PREFERRED EMBODIMENTS

Figure 1:
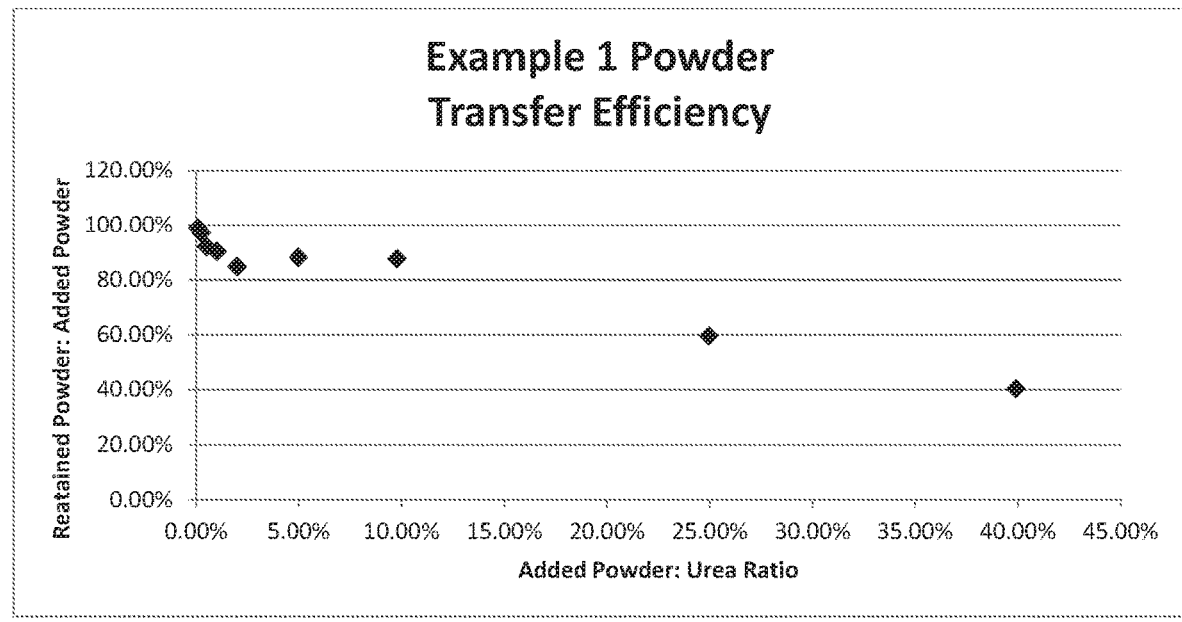
FIG. 1 is a graph showing the transfer efficiency of the formulation of Example 1.

The present invention overcomes the problems of the prior art by broadly providing a microscopic buffering system that aids in the time-release and/or uptake of plant available molybdenum.

Inventive Fertilizer Composition Ingredients

In more detail, the present invention provides a fertilizer composition comprising:
(I) at least one source of calcium;
(II) at least one source of molybdenum; and
(III) one or both of the following:
  (a) another source of calcium different from the at least one calcium source; and/or
  (b) another source of molybdenum different from the at least one molybdenum source.

It is preferred that the at least one calcium source (I) is a relatively insoluble form of calcium. More particularly, it is preferred that the at least one calcium source (I) has a solubility of less than about 2.0 g/L in water, preferably less than about 0.5 g/L in water, more preferably less than about 0.05 g/L in water, and even more preferably from about 0.00001 g/L to about 0.05 g/L, all at 25° C. Particularly preferred sources of calcium for the at least one calcium source (I) are selected from the group consisting of calcium carbonate, calcium sulfate, calcium hydroxide calcium hydroxyl apatite, calcium molybdate, and mixtures thereof.

In instances where "another" (i.e., second) source of calcium (designated as (III)(a) above) is present in the fertilizer composition, it is preferred that this other calcium source (III)(a) is relatively soluble. That is, calcium source (III)(a) is more soluble in water (25° C.) than the at least one calcium source (I). It is preferred that the other source of calcium (III)(a) be at least about 50 times more soluble, more preferably at least about 100 times more soluble, and even more preferably at least about 500 times more soluble in water than the at least one calcium source (I). Additionally, it is preferred that the $pK_a$ of the calcium source (III)(a) is lower than the $pK_a$ of the at least one calcium source (I)—preferably at least 1 $pK_a$ unit lower, more preferably at least 2 $pK_a$ units lower, and even more preferably at least 3 $pK_a$ units lower.

As noted, particularly preferred other calcium sources (III)(a) are relatively soluble in water. That is, it is preferred the other calcium source (III)(a) (when present) has a solubility of at least about 2.5 g/L in water, preferably from about 2.5 g/L to about 50 g/L in water, more preferably from about 5 g/L to about 100 g/L in water, and even more preferably from about 25 g/L to about 1,000 g/L in water, all at 25° C. Preferred such calcium sources (III)(a) are selected from the group consisting of calcium ammonium nitrate, calcium citrate, calcium acetate, calcium malate, calcium nitrate (preferably in tetrahydrate form), calcium chloride, and mixtures thereof.

The determination of whether another calcium source (III)(a) is utilized will depend upon the soil composition. In some instances, the soil composition (e.g., soil containing water-soluble acid salts or water-soluble organic acids) may render the calcium source (III)(a) less necessary for the present invention to function properly. Such components may be native to the soil, added externally before, during, and/or after fertilizer application, or some combination of the foregoing.

It is preferred that the at least one molybdenum source (II) is a relatively soluble (in water at 25° C.) form of molybdenum. Particularly preferred at least one molybdenum source (II) is selected from the group consisting of sodium molybdate (preferably dihydrate), ammonium heptamolybdate, potassium molybdate, ammonium molybdate tetrahydrate, and mixtures thereof.

In instances where another source of molybdenum (III)(b) is included, it can be soluble or insoluble in water at 25° C. However, it is preferred that the at least one source of molybdenum (II) is more soluble than the other molybdenum source (III)(b) in water at 25° C. Particularly preferred second molybdenum sources (III)(b) are selected from the group consisting of molybdenum trioxide, powellite (calcium molybdate), molybdenum dioxide, and mixtures thereof. This novel combination of molybdenum sources, coupled with up to two calcium sources provides the localized buffering effect. This will create an environment in which molybdenum will have an increased uptake over a period of time.

In a further embodiment, the fertilizer composition can include a third source of molybdenum, with this third molybdenum source being different from the molybdenum sources (II) and (III)(b) discussed above. One preferred such third source is ammonium dimolybdate.

A number of other optional ingredients can also be included in the fertilizer composition, if desired. Some of those ingredients include those selected from the group consisting of dispersing agents (e.g., sodium salt of naphthalene sulfonate condensate, zeolite, talc, graphite), anti-caking agents, desiccants (e.g., silicon dioxide), dyes, flow agents, micronutrients other than molybdenum, macronutrients other than calcium, and mixtures thereof.

Micronutrients other than molybdenum include those selected from the group consisting of nickel, copper, zinc, manganese, boron, iron, chloride, and selenium. Macronutrients other than calcium include those selected from the group consisting of sulfur, phosphorus, magnesium, potassium, and nitrogen. Beneficial nutrients other than sodium include those selected from the group consisting of silicon, carbon, hydrogen, and oxygen.

In one embodiment, the fertilizer composition consists essentially of, or even consists of:

(I) at least one calcium source;

(II) at least one source of molybdenum; and (III) one or both of the following, with or without the optional ingredients described above:

(a) another source of calcium different from the at least one calcium source; and/or (b) another source of molybdenum different from the at least one molybdenum source.

In another embodiment, the fertilizer composition comprises, consists essentially of, or even consists of:

(I) only one calcium source;

(II) at least one source of molybdenum; and (III) another source of molybdenum different from the at least one molybdenum source, where (I), (II), and (III) can be the sources described previously, and with or without the previously-described optional ingredients in the fertilizer composition.

In a further embodiment of the present invention comprises calcium carbonate as the at least one source of calcium (I), sodium molybdate (preferably dihydrate) as the at least one source of molybdenum (II), calcium ammonium nitrate as the other calcium source (III)(a), and molybdenum trioxide as the second molybdenum source (III)(b), with or without the optional ingredients described above. In yet a further embodiment consists essentially of, or even consists of, calcium carbonate as the at least one source of calcium (I), sodium molybdate (preferably dihydrate) as the at least one source of molybdenum (II), calcium ammonium nitrate as the other calcium source (III)(a), and molybdenum trioxide as the second molybdenum source (III)(b), with or without the optional ingredients described above.

In one embodiment, the fertilizer composition is essentially free of micronutrients and macronutrients other than molybdenum, calcium, and nitrogen. In this such embodiment, the fertilizer composition comprises less than about 3% by weight, preferably less than about 1% by weight, more preferably less than about 0.1% by weight, and preferably about 0% by weight micronutrients and macronutrients other than calcium and molybdenum, based upon the total weight of the fertilizer composition taken as 100% by weight.

The preferred ranges of various ingredients are set forth in Table 1.

TABLE 1

| INGREDIENT | BROADEST RANGE** | PREFERRED** | MOST PREFERRED** |
|---|---|---|---|
| At least one Calcium Source (I) | about 20% to about 80% | about 35% to about 70% | about 55% to about 65% |
| At least one Molybdenum Source (II) | about 1% to about 50% | about 5% to about 25% | about 9% to about 12% |
| Second Calcium Source (III)(a)* | about 2% to about 25% | about 8% to about 12% | about 9% to about 11% |
| Second Molybdenum Source (III)(b)* | about 1% to about 50% | about 5% to about 25% | about 9% to about 12% |
| Third Molybdenum Source* | about 0.001% to about 10% | about 0.01% to about 5% | about 0.1% to about 3% |
| Dispersing Agents* | about 0.1% to about 15% | about 0.5% to about 12% | about 1% to about 6% |
| Desiccants* | about 0.01% to about 5% | about 0.1% to about 3% | about 1% to about 3% |
| Dyes* | about 0.001% to about 1% | about 0.001% to about 0.5% | about 0.01% to about 0.3% |

*In embodiments where this ingredient is present (i.e., when it is not 0%).
**All ranges are % by weight, based upon the total weight of the fertilizer composition taken as 100% by weight.

Advantageously, each ingredient utilized to form the fertilizer composition is provided in a fine powder form. The average particle size of each ingredient powder utilized should be less than about 170 μm, preferably from about 25 μm to about 170 μm, more preferably from about 50 μm to about 160 μm, and even more preferably from about 50 μm to about 100 μm. In one embodiment, at least about 50%, preferably at least about 70%, more preferably at least about 85%, even more preferably at least about 95%, and most preferably about 100% of the particles in the fertilizer composition will have a particle size in this range. Importantly, the molybdenum sources also have this small particle size, which is much smaller than the traditional molybdenum sources used with prior art methods.

Furthermore, the ingredients can be provided in various combination of hydrated, dry, and mixtures thereof. In a preferred embodiment, the ingredients have individual moisture contents of less than about 3% by weight, preferably less than about 1% by weight, more preferably less than about 0.1% by weight, and preferably about 0% by weight, based upon the total weight of the particular ingredient utilized taken as 100% by weight.

In another preferred embodiment, no liquids (e.g., water, solvents, oils) are included in the fertilizer composition. That is, the levels of liquids in the fertilizer compositions are less than about 3% by weight, preferably less than about 1% by weight, more preferably less than about 0.1% by weight, and preferably about 0% by weight, based upon the total weight of the fertilizer composition taken as 100% by weight.

Methods of Forming the Inventive Fertilizer Compositions

The inventive compositions are formed by first reducing the particle size of any ingredients that do not already have the above-noted particle size ranges. This can be accomplished by conventional particle size reduction methods and equipment (e.g., milling). Particle size is reduced until the material resembles a fine powder. Additionally, the particle size is determined by conventional methods, including by simply passing the particles through an analytical sieve to screen out particles having an undesirable size.

Once each of the ingredients has its desired particle size and appearance, the ingredients are then blended together until a substantially uniform mixture is achieved (typically from about 5 to about 10 minutes of mixing). Preferably, this is accomplished via dry blending. That is, it is preferred that no liquid (e.g., water, oils, solvents) be added during or after the blending, so that the formed fertilizer composition is a dry mixture. The formed composition preferably has a moisture content of less than about 3% by weight, preferably less than about 1% by weight, more preferably less than about 0.1% by weight, and preferably about 0% by weight, based upon the total weight of the fertilizer composition taken as 100% by weight. Some conventional equipment may allow for simultaneous particle size reduction and blending in a one step process. In such cases, special care should be taken to note particle sizes post-blending; larger material volumes may reduce particle size transfer efficiency.

Coated Fertilizer Products Comprising

Inventive Fertilizer Compositions

Although the above-described fertilizer compositions can be utilized alone (i.e., in powder form), in a preferred embodiment they are used in conjunction with a carrier. That is, the fertilizer composition is preferably coated onto a carrier so that it coats at least some of the outer surface of that carrier. This coating can be accomplished by simply mixing the fertilizer composition with the carrier until a substantially uniform coating has been achieved (typically from about 1 minute to about 5 minutes).

Preferred carriers are agronomic carriers, with examples including those selected from the group consisting of seeds, conventional fertilizer products (e.g., nitrogen, phosphate, potassium, sulfur, calcium and/or magnesium fertilizer products), urea prills, dry or granular fertilizer products, inert pellets, biodegradable pellets, and suspensions (both aqueous and non-aqueous).

In instances where the carrier is a seed, that seed can be inoculated, or inoculation of the seed can be avoided entirely. In one embodiment, it is preferred that the seed is not inoculated with *Rhizobium*. In another embodiment, the seed is not inoculated at all.

In instances where the carrier is other than a seed and the invention is used to provide molybdenum to soil where seeds are to be planted, those seeds to be planted can also be inoculated or non-inoculated. However, in one such embodiment, it is preferred that the seed is not inoculated with *Rhizobium*. In another embodiment, it is preferred that the seed is not inoculated at all.

In one embodiment, the carrier is one having a relatively small particle size. In these instances, the largest average surface-to-surface dimension of the carrier is from about 0.1 mm to about 0.5 mm, preferably from about 0.5 mm to about 1 mm, and more preferably from about 2 mm to about 5 mm.

The fertilizer composition is preferably coated onto the carrier at sufficient levels that the final coated fertilizer product includes the powdered fertilizer composition at levels of from about 0.1% by weight to about 10% by weight, preferably from about 0.25% by weight to about 2% by weight, and more preferably from about 0.5% by weight to about 1.5% by weight, based upon the total weight of the coated fertilizer product taken as 100% by weight. In a preferred embodiment, the balance of that weight is entirely attributable to the carrier. In other words, there are no other layers or coatings (e.g., no acidifying agents) above or below the fertilizer composition coating so that the coated fertilizer product consists essentially of, or even consists of, the carrier and inventive fertilizer composition coated on the carrier.

Preferably, the carrier is a dry carrier so that the fertilizer composition coats the dry outer carrier surface. Unless a liquid suspension is used as carrier, no liquid (e.g., solvent, water, oil) should be added during or after the blending of the carrier and fertilizer composition (i.e., it's a "dry-on-dry" blending). As a result, the moisture content of the fertilizer composition coating does not increase from its starting moisture content during this process and certainly falls within the moisture content ranges set forth above.

Advantageously, the inventive fertilizer compositions have good transfer efficiencies. As used herein, "transfer efficiency" is determined as set forth in Example 2. That is, at an addition rate of from about 1% to about 10%, the transfer efficiency of the inventive fertilizer compositions is at least about 80%, and preferably at least about 85%. At addition rates of from about 1% to about 5%, the transfer efficiency is at least about 85%, and preferably at least about 90%.

Furthermore, the inventive compositions have a good shelf life (determined as set forth in Example 4). That is, the compositions exhibit little to no caking after spending as much as 10, 20, or even 25 hours in even 100% humid conditions.

Methods of Using Inventive Fertilizer Compositions and/or Coated Fertilizer Products As noted previously, the above-described fertilizer compositions can be utilized alone in their blended powder form, but more preferably they are coated onto a carrier and utilized as a coated or suspended fertilizer product. Regardless of the method involved for introducing the fertilizer composition into an environment, the introduction typically involves contacting the product with soil and/or water. The unique combination and particle size of the ingredients in the present invention will generate "microscopic bursts" of pH changes (>7) upon contact with the soil or water. This microscopic buffered environment will have dissolved molybdenum, thereby ultimately increasing the availability of the molybdenum to the plant. For example, 1. Prior to application of the present invention, soil will typically have an acidic pH range of 3.5 to 6.5. Other soil will be basic and have a pH range of 7.5 to 9.0. As used herein, the "first pH" is the pH of the soil at the moment immediately prior to step 2 below, regardless of whether one source or two sources of calcium will be utilized.

2. Upon contact with the soil and water (this water may already be present in the soil, either intentionally or inherently, e.g., externally-applied, rain water, and/or moisture from ground water), the water-soluble, low-$pK_a$ calcium source (i.e., the other source of calcium (III)(a), if utilized) of the present invention will quickly dissolve, leaving the surrounding soil environment at a low pH (i.e., the second pH) as a weak acid. In one embodiment where the initial soil pH is greater than the pKa of the secondary calcium source (i.e., the at least one calcium source (I), this second pH results in a pH change so that the second pH is less than the first pH (i.e., less than the initial soil pH). In another embodiment where the initial soil pH is lower than the pKa of the secondary calcium source (i.e., the at least one calcium source (I), this second pH results in a pH change so that the second pH is greater than the first pH (i.e., greater than the initial soil pH).

3. The other calcium source (III)(a) will then begin to etch away the low-soluble, high $pK_a$ calcium source (i.e., the at least one source of calcium (I)), thus creating a weak base.

4. When the weak acid and the weak base begin to mix together, a local microscopic burst of a higher, buffered pH environment will be created. In instances where two sources of calcium will be utilized, this is the change to a third pH that takes place. In instances where only one source of calcium is used (i.e., only the at least one source of calcium (I)), this pH change is the one that takes place from the first pH (i.e., the initial soil pH) to the second pH. Regardless, it is preferred that this third pH is greater than the second pH.

5. This newly-formed, high, buffered pH environment, which is referred to as either the second pH or the third pH depending upon the number of calcium sources utilized, as noted above, will allow for soluble molybdenum to be taken up through a plant's root hairs more efficiently.

6. The local release of a high pH from the at least one calcium source (I) will eventually be overcome by the surrounding pH environment, resulting in no bulk change of the environment's pH and therefore allowing effective uptake of other micro or macronutrients.

7. In this process, the low $pK_a$ calcium solution (i.e., from the another source of calcium (III)(a)) will continue to etch fragments from the secondary calcium source (i.e., the at least one calcium source (I)) and dissolve it, thereby generating more local bursts of high pH zones (third pH) until all of the at least one calcium source (I) has been consumed.

8. The entire process should take several weeks to months, but will be dependent on the pH environment. Lower pH environments will induce faster consumption. However, lower pH environments will dissolve the insoluble molybdenum source quicker, which in turn increases molybdenum uptake. Higher pH environments will induce slower consumption of the at least one calcium source (I), but will have higher molybdenum uptake due to the higher pH environment.

It will be appreciated that the present invention offers a number of advantages not present in the prior art. For example, the present invention allows molybdenum to be "metered out" at the low rates that plants require and in a pattern with spatial frequency that maximizes the probability that individual crop plant roots will encounter molybdenum. That is, the carrier can be used as a "vector" to more evenly spread the molybdenum throughout a field. Importantly, the present invention counteracts the acidity zones created around fertilizer granules by creating localized buffers at the source of uptake, thus ensuring the plants contact molybdenum in a usable form and that such contact takes place over the course of weeks.

Although this invention finds use with any crop needing molybdenum supplementation, it is particularly beneficial for use with crops selected from the group consisting of nitrogen fixing crops, as well as broccoli, Brussel sprouts, cabbage, cauliflower, lettuce, spinach, sugarbeets, tomatoes, and tobacco.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth preferred methods in accordance with the invention. It is to be understood, however, that these examples are provided by way of illustration and nothing therein should be taken as a limitation upon the overall scope of the invention.

Example 1

Inventive Formulation Preparation

A formulation was prepared using the ingredients and quantities shown in Table 2. Each ingredient was ground by a coffee grinder to a particle size of about 149 μm (100 mesh) or smaller. Each individually ground ingredient was mixed after grounding to ensure representative sampling. Under ambient conditions, all raw ingredients were combined together using a mixer (from Kitchen Aid) to ensure uniform mixing, after which the product was packaged and sealed.

TABLE 2

| INGREDIENT | QUANTITY* |
|---|---|
| Calcium Carbonate (sold under the name OMYACARB 3-FL, by Omya International AG) | 63.47% |
| Calcium Ammonium Nitrate (sold under the name Calcinit, by YARA) | 9.98% |
| Sodium Molybdate Dihydrate (sold under the name Sodium Molybdate Dihydrate, by North Metal and Chemical Company) | 9.18% |
| Molybdenum Trioxide (sold under the name Molybdenum Trioxide, by North Metal and Chemical Company) | 9.18% |
| Ammonium Dimolybdate (sold under the name Ammonium Dimolybdate, by North Metal and Chemical Company) | 2.00% |
| Morwet ® D-425 (dispersing agent; sodium salt of naphthalene sulfonate condensate, AkzoNobel) | 3.99% |
| Silicon Dioxide (sold under the name SIPERNAT ®, by Evonik) | 2.00% |
| Blue Dye (sold under the name Orcoperm Blue 3GN, by Organic Dyes and Pigments, LLC) | 0.2% |

*% by weight based on the combined weight of all ingredients taken as 100% by weight.

Example 2

Retention Testing

Fine powder fertilizers are often difficult to spread across a field in a uniform manner, and thus require a carrier to achieve better dispersion. This requires a powder product to adhere quite easily to the selected carrier, which is generally some combination of N, P, K fertilizers. The powder product prepared in Example 1 was subjected to retention testing to determine its ability to coat a carrier (urea, in this instance) and remain on that carrier.

"Retention test" as used herein is defined as the procedure described in this Example 2. First, urea (sold under the name 46-0-0 Urea, by Farmers Union Coop.) was sieved to a particle size of from about 2 mm (US mesh 10) to about 4.76 mm (US mesh 4). About 100 g of the sieved urea and about 0.1 g of the Example 1 sample were placed in a clear polyethylene screw-cap container (e.g., U-line containers from Grainger), with the exact weight of each being recorded. The container was capped and sealed, followed by gentle rolling end-over-end for 2 minutes. The container was then uncapped, and its contents were poured onto a US mesh 14 (1.41 mm), followed by gentle shaking for 30 seconds. A Chemwipe was used to remove any clinging powder from the sides of the polyethylene container. Powder retained on the US mesh 14 sieve was placed back into the same polyethylene container, and the exact weight was determined. This test was repeated several times as described above, except changing the Example 1 powder sample quantities with each repetition as follows: 0.25 g, 0.5 g, 1.0 g, 2.0 g, 5.0 g, 10 g, 25 g, and 40 g. (Using larger quantities of the powder sample may require multiple sieve steps to remove all non-coated sample.)

Retention test results will indicate transfer efficiency and adhesion rate. Transfer efficiency is the ratio of a dry powder fertilizer that sticks to a carrier versus the total amount of the fertilizer added. Many carrier coating processes involve a recycle loop that takes any uncoated portion of the carrier and recirculates it through the system for an additional round of carrier coating. The transfer efficiency measures how well the product adhered to the carrier in one single pass. Adhesion rate is the ratio of the product that sticks to the carrier versus the total amount of the product present. This allows for the maximum possible adhesion to be estimated upon an infinite number of passes through the carrier recycle loop system.

The results of this Example 2 illustrated remarkable transfer efficiency as well as an extraordinarily high adhesion rate for a dry powder fertilizer. FIG. 1 and Table 3 set forth these results, with the calculations being as follows:

$$\text{Transfer Efficiency } \% = \left[\frac{\text{Powder Retained (g)}}{\text{Powder Added (g)}}\right] \times 100$$

$$\% \text{ Adhesion} = \left[\frac{\text{Powder Retained (g)}}{\text{Powder Retained (g)} + \text{Urea (g)}}\right] \times 100$$

TABLE 3

| Weight of the dry powder product prepared in Example 1 (g) | Weight of Urea (g) | Total Weight (g) | the dry power product prepared in Example 1 Adhered (g) | Transfer Efficiency % of the dry power product prepared in Example 1 | the dry powder product prepared in Example 1 % Adhesion |
|---|---|---|---|---|---|
| 0.097 | 100.908 | 101.005 | 0.096 | 98.97% | 0.10% |
| 0.249 | 100.079 | 100.328 | 0.242 | 97.19% | 0.24% |
| 0.503 | 100.103 | 100.606 | 0.463 | 92.05% | 0.46% |
| 1.014 | 100.154 | 101.168 | 0.916 | 90.34% | 0.91% |
| 1.997 | 100.282 | 102.279 | 1.693 | 84.78% | 1.69% |
| 5.002 | 100.203 | 105.205 | 4.411 | 88.18% | 4.40% |
| 9.911 | 101.211 | 111.122 | 8.69 | 87.68% | 8.59% |
| 25.018 | 100.231 | 125.249 | 14.9 | 59.56% | 14.87% |
| 39.939 | 100.073 | 140.012 | 16.134 | 40.40% | 16.12% |

The transfer efficiency of the formulation from Example 1 did not drop below 84.5% until the addition rate (Product Added:Urea Added) climbed higher than 10%. For reference, at only a 1% addition rate the transfer efficiency for ammonium dimolybdate and sodium molybdate dihydrate were 0.4% and 19.6% respectively. The adhesion rate of the formulation from Example 1 showed that maximum adhesion peaks at about 15%. This was dramatically higher than either of the two competitors, which peaked at <0.1% and at about 1.0% for ammonium dimolybdate and sodium molybdate dehydrate respectively.

Example 3 pH Analysis

Local pH monitoring can be difficult to analyze because it will happen at the microscopic level. It is suspected that the low $pK_a$ calcium source will etch the calcium carbonate to form a weak base buffer. The weak base will then be overcome by the soil and only provide short, local microscopic bursts of pH giving enough time for molybdenum uptake. This Example 3 illustrates the pH change that occurs on a macro-scale confirming that the microscopic pH change occurs. This example observes the bulk change in pH to a neutral water solution via the addition of the powder product prepared in Example 1. This example describes how a pH analysis as used herein should be carried out. In this procedure, 25 g of the powder prepared in Example 1 was measured into a clean 600-mL glass beaker. Next, 300 g of 18.2 MΩ pure DI water and a clean stir bar were placed into the beaker. The beaker was sealed and stirred continuously for 1 week and the pH was monitored at pre-determined time intervals. Table 4 sets forth these results:

TABLE 4

| Blending Time (hours) | pH |
|---|---|
| 0 | 7.1 |
| 24 | 7.6 |
| 48 | 8.1 |
| 168 | 8.2 |

The results revealed a slow increase of pH over time. The increase of pH showed that the novel combination of ingredients in Example 1 generated a pH buffered solution over time.

Example 4

Shelf Life Study

When most fine powders absorb moisture that is subsequently removed in dry climates, a recrystallization occurs and leads to product caking. This will impede product adhesion to a carrier, as well as its "flowability." In this Example 4, accelerated shelf life studies were performed by subjecting the powder product prepared in Example 1 to 100% humid conditions for set periods of time. The moisture of the product was then baked off to monitor whether or not the product was prone to caking.

Shelf life of a sample, as used herein, is determined as described in this example.
1. Four 10-gram samples were placed into separate containers.
2. The uncapped containers from step (2) were placed on shelf in a chamber that had 200 ml of water at the bottom.
3. The chamber was sealed and a constant vacuum was generated with a pressure of about 0.06 MPa.
4. After 1 hour, the chamber was returned to atmospheric conditions, one sample was removed, and the chamber was placed under vacuum with a constant pressure of about 0.06 MPa.
5. The sample was placed on a moisture balance at 180° C. to measure how much moisture was absorbed by the sample.
6. Steps (5)-(6) were repeated with each of the remaining three samples, but holding the chamber at pressure of 0.06 MPa for time periods of 3 hours, 5 hours, and 24 hours, respectively, before returning to atmospheric pressure and removing the next sample.

Figure 2:
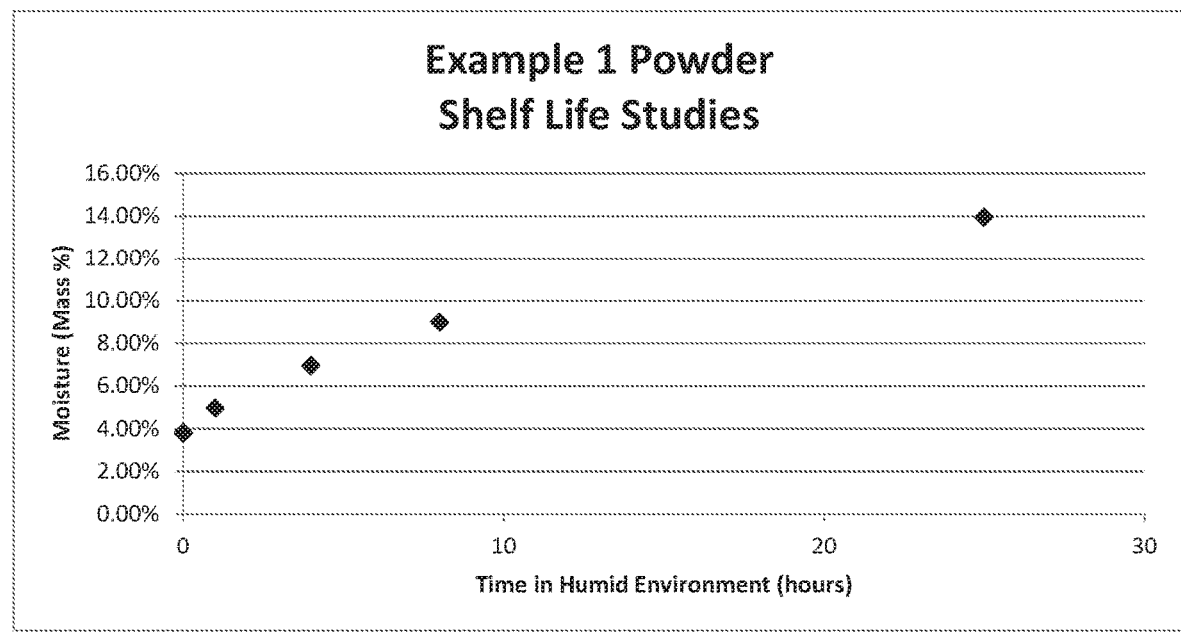
FIG. 2 is a graph depicting the retention testing carried out in Example 2.

The shelf life stability results are shown in Table 5 and FIG. 2. After each sample was removed from the moisture balance, it was inspected for any signs of product caking. In all cases of this study, including after 25 hours and a large 14% increase to product moisture, there was no signs of product caking. This supports that the powder product prepared in Example 1 has a long shelf life and therefore will not have adverse effects to carrier adhesion or product flowability.

TABLE 5

| Time in Humid Environment (hours) | Moisture in the powder product prepared in Example in Example 1 (Mass %) |
| --- | --- |
| 0 | 3.81% |
| 1 | 4.98% |
| 4 | 6.96% |
| 8 | 9.00% |
| 25 | 13.95% |

Example 5

Wheat Grass Trials

This Example 5 performed a comparative study between the powder product prepared in Example 1, two common soluble molybdenum sources (ammonium dimolybdate and sodium molybdate dihydrate), and a macronutrient control. The control served as a basis for comparison between the powder product of Example 1 and the two other molybdenum sources. Observed differences in plant tissue biomass, nitrogen uptake efficiency, and soluble molybdenum uptake efficiency were documented as follows.

In this procedure, an aqueous solution of ammonium dimolybdate, an aqueous solution of sodium molybdate dihydrate, and an aqueous suspension of the Example 1 formulation were added to separate pots containing growth medium (50:50 peat moss/vermiculite at pH 5.5). These three test samples were added at levels of 40 ppb molybdenum.

Next, 4 wheat grass seeds were placed in each pot, with 3 replicate pots for each molybdenum source at each concentration noted above. Macronutrient fertilizer (specifically Urea, obtained from Brenntag, monoammonium phosphate, obtained from Agri-Feed Products, sulfate of potash 171X, obtained from Compass Minerals at ratios of 2:1:1) was added to each of these pots at a level of 220 ppm (Urea concentration), as well as to three additional pots that had no molybdenum added (i.e., only the macronutrient fertilizer) as a control from comparison.

Figure 3:
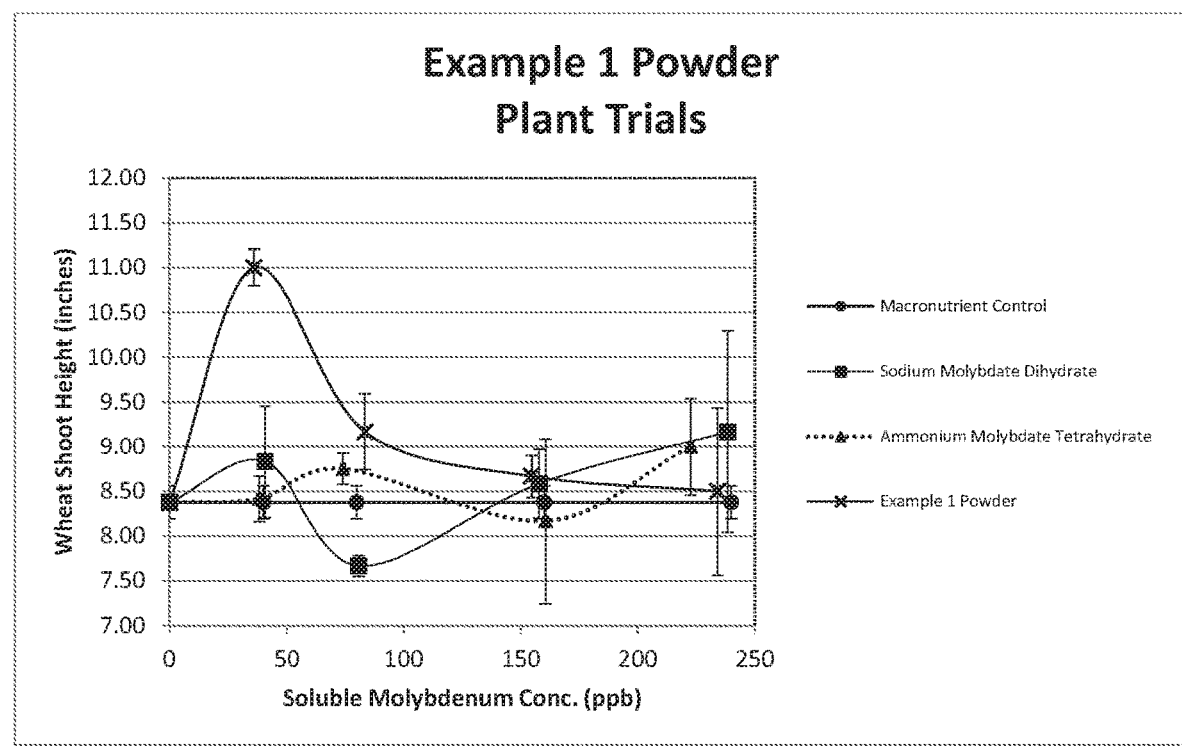
FIG. 3 is a graph of the results of the plant trials described in Example 5.

After six weeks of watering, all replicate heights were measured and recorded. Then the tissue was removed, dried, and grinded. The biomass for the plant tissue in each pot was recorded. Each plant tissue sample from the pots was tested for nitrogen update efficiency, and molybdenum uptake efficiency by a third party laboratory (Agvise Laboratories). FIG. 3 and Table 6 sets forth these results. Averages for all three categories were compared at 40 ppb molybdenum, the ideal theoretical concentration for soluble molybdenum uptake into a plant. Standard Error of the mean for each product was then compared to determine significance of difference.

The results found in this example illustrate the remarkable performance of the powder product prepared in Example 1. At 40 ppb molybdenum concentration added to each pot, the wheat grass biomass was 22% larger in the pots containing the powder product of Example 1 when compared to the macronutrient control. This result returned a significantly larger biomass than all other monitored cases in this study. The soluble molybdenum uptake efficiency revealed a very similar result, with 64.1% of all soluble molybdenum added being taken up into the plant. This was significantly larger than both molybdenum competitors, and nearly a 40% improvement to sodium molybdate dihydrate, which had the second highest efficiency in the study at this concentration. Nitrogen uptake efficiency was also highest in the pots containing the powder product prepared in Example 1, at the 46% increase from the macronutrient control. This result was much higher than the increases observed for ammonium dimolybdate and sodium molybdate dihydrate at 30% and 8% respectively. The combined results from all three categories showed that the dry power product prepared in Example 1 delivered molybdenum with a significantly higher efficiency, leading to larger nitrogen uptake efficiencies, and a significantly larger wheat grass biomass.

TABLE 6

Wheat Grass Trials (40 ppb Mo)

| | Biomass (g) | | Nitrogen Uptake Efficiency (Mass %) | | Soluble Molybdenum Update Efficiency (Mass %) |
| --- | --- | --- | --- | --- | --- |
| Macronutrient Control | 0.46 | — | 11.71% | — | 0.00% |
| Formulation from Example 1 | 0.56* | +22% | 17.06% | +46% | 64.08%* |
| Sodium Molybdate Dihydrate | 0.46 | +00% | 12.70% | +08% | 46.11% |
| Ammonium Dimolybdate | 0.48 | +04% | 15.22% | +30% | 37.95% |

*Indicates significance based on standard error of the mean for the average of all replicates at 40 ppb Mo concentration (n = 3)

We claim:
1. A fertilizer composition comprising a mixture of:
   (I) at least one source of calcium, wherein said at least one source of calcium is selected from the group consisting of calcium carbonate, calcium sulfate, calcium hydroxide, calcium hydroxy apatite, calcium molybdate, and mixtures thereof;
(II) at least one source of molybdenum; and
(III) (a) another source of calcium different from the at least one calcium source (I), wherein said another source of calcium (III)(a) is selected from the group consisting of calcium nitrate and calcium ammonium nitrate; and
   (b) optionally, another source of molybdenum different from the at least one molybdenum source (II).

2. The composition of claim 1, said fertilizer composition comprising another source of molybdenum (III)(b).

3. The composition of claim 2, wherein:
said at least one source of calcium (I) is calcium carbonate;
said at least one source of molybdenum (II) is sodium molybdate;
said another source of calcium (III)(a) is calcium nitrate; and
said another source of molybdenum (III)(b) is molybdenum trioxide.

4. The composition of claim 1, wherein another source of calcium (III)(a) is more soluble in water than said at least one source of calcium (I).

5. The composition of claim 4, wherein said source of calcium (III)(a) comprises calcium ammonium nitrate.

6. The composition of claim 1, wherein said at least one source of molybdenum (II) is selected from the group consisting of sodium molybdate, ammonium heptamolybdate, potassium molybdate, ammonium molybdate tetrahydrate, and mixtures thereof.

7. The composition of claim 1, said fertilizer composition comprising another source of molybdenum (III)(b), wherein said source of molybdenum (III)(b) is selected from the group consisting of molybdenum trioxide, powellite, molybdenum dioxide, and mixtures thereof.

8. The composition of claim 7, wherein the fertilizer composition further comprises a third source of molybdenum different from the at least one source of molybdenum (II) and different from the another source of molybdenum (III)(b).

9. The composition of claim 1, wherein said fertilizer composition comprises a blend of powder ingredients.

10. The composition of claim 9, wherein the average particle size of each powder ingredient is less than about 170 µm.

11. The composition of claim 1, wherein said fertilizer composition has a moisture content of less than about 3% by weight, based upon the total weight of the fertilizer composition taken as 100% by weight.

12. The composition of claim 1, further comprising an ingredient selected from the group consisting of dispersing agents, drying agents, dyes, flow agents, beneficial nutrients other than sodium, micronutrients other than molybdenum, macronutrients other than calcium, and mixtures thereof.

13. The composition of claim 1, wherein said at least one source of calcium (I) is present in an amount of from about 20% to about 80%, said at least one source of molybdenum (II) is present in an amount of from about 1% to about 50%, and said another source of calcium (III)(a) is present in an amount of about 2% to about 25%, when present, and said another source of molybdenum (III)(b) is present in an amount of about 1% to about 50%, when present.

14. The composition of claim 1, wherein said another source of calcium (III)(a) is water soluble and has a lower pKa than said at least one source of calcium (I) and wherein at least 50% of the particles of each of (I), (II), (III)(a), and (III)(b), when (III)(b) is present, have an average particle size in the range of from about 25 microns to about 170 microns.

15. A coated fertilizer product comprising a carrier coated with the fertilizer composition of claim 1.

16. The product of claim 15, wherein another source of calcium (III)(a) is more soluble in water than said at least one source of calcium (I).

17. The product of claim 16, wherein said source of calcium (III)(a) comprises calcium ammonium nitrate.

18. The product of claim 15, said fertilizer composition comprising another source of molybdenum (III)(b), wherein said source of molybdenum (III)(b) is selected from the group consisting of molybdenum trioxide, powellite, molybdenum dioxide, and mixtures thereof.

19. The product of claim 18, wherein the fertilizer composition further comprises a third source of molybdenum different from the at least one source of molybdenum (II) and different from the another source of molybdenum (III)(b).

20. The product of claim 15, wherein said fertilizer composition comprises a blend of powder ingredients.

21. The product of claim 20, wherein the average particle size of each powder ingredient is less than about 170 µm.

22. The product of claim 15, wherein said carrier is an agronomic carrier.

23. The product of claim 15, said fertilizer composition comprising another source of molybdenum (III)(b).

24. The product of claim 15, wherein said at least one source of calcium (I) is selected from the group consisting of calcium carbonate, calcium sulfate, calcium hydroxide calcium hydroxyl apatite, calcium molybdate, and mixtures thereof.

25. The product of claim 15, wherein said at least one source of molybdenum (II) is selected from the group consisting of sodium molybdate, ammonium heptamolybdate, potassium molybdate, ammonium molybdate tetrahydrate, and mixtures thereof.

26. The product of claim 15, wherein said carrier has an outer surface, and said outer surface is dry.

27. The product of claim 15, wherein said product comprises from about 0.1% to about 10% by weight fertilizer composition, based upon the total weight of the coated fertilizer product taken as 100% by weight.

28. A method of forming a coated fertilizer product comprising applying the fertilizer composition of claim 1 to the outer surface of a carrier.

29. The method of claim 28, wherein said carrier is an agronomic carrier.

30. The method of claim 28, wherein said carrier has an outer surface, and said outer surface is dry.

31. A method of molybdenum fertilization comprising introducing a fertilizer composition according to claim 1 into an environment to be fertilized with molybdenum.

32. The method of claim 31, wherein said introducing comprises contacting said fertilizer composition with soil.

33. The method of claim 32, wherein said soil has a first pH before said contacting and, after said contacting, said soil has a second pH that is different from said first pH.

34. The method of claim 33, wherein said source of calcium (III)(a) causes said first pH to change to said second pH.

35. The method of claim 34, wherein said second pH changes to a third pH, and said third pH is equal to or higher than said second pH.

36. The method of claim 35, wherein said at least one source of calcium (I) causes said second pH to change to the third pH.

37. The method of claim 36, wherein said fertilizer composition further comprises the another source of molybdenum (III)(b), and molybdenum from said another source of molybdenum (III)(b) becomes available for plant uptake as the second pH changes to said third pH and/or after said third pH is reached.

38. The method of claim 37, wherein the fertilizer composition further comprises a third source of molybdenum different from the at least one source of molybdenum (II) and different from the another source of molybdenum (III)(b).

39. The method of claim 33, wherein said at least one source of calcium (I) causes the first pH to change to said second pH.

40. The method of claim 39, wherein the molybdenum from said at least one source of molybdenum (II) becomes available for plant uptake as the first pH changes to said second pH and/or after said second pH is reached.

41. The method of claim 31, wherein said fertilizer composition is in the form of a coating on a carrier.

42. The method of claim 32, wherein the molybdenum from said at least one source of molybdenum (II) becomes available for plant uptake upon contact with said soil.

43. A method of forming a fertilizer composition comprising blending together ingredients comprising:
(I) at least one source of calcium, wherein said at least one source of calcium is selected from the group consisting of calcium carbonate, calcium sulfate, calcium hydroxide, calcium hydroxy apatite, calcium molybdate, and mixtures thereof;
(II) at least one source of molybdenum; and
(III) (a) another source of calcium different from the at least one calcium source (I), wherein said another source of calcium (III)(a) is selected from the group consisting of calcium nitrate and calcium ammonium nitrate; and
(b) optionally, another source of molybdenum different from the at least one molybdenum source (II).

44. The method of claim 43, wherein said ingredients are dry powders, and no liquid is adding during said blending.

45. The method of claim 44, wherein the average particle size of each powder ingredient is less than about 170 µm.

46. The composition of claim 43, wherein said at least one source of calcium (I) is present in an amount of from about 20% to about 80%, said at least one source of molybdenum (II) is present in an amount of from about 1% to about 50%, and said another source of calcium (III)(a) is present in an amount of about 2% to about 25%, when present, and said another source of molybdenum (III)(b) is present in an amount of about 1% to about 50%, when present.

47. A fertilizer composition comprising a mixture of:
(I) at least one source of calcium selected from the group consisting of calcium carbonate, calcium sulfate, calcium hydroxide, calcium hydroxy apatite, calcium molybdate, and mixtures thereof;
(II) at least one source of molybdenum; and
(III)(a) another source of calcium selected from the group consisting of calcium nitrate and calcium ammonium nitrate; and
(b) another source of molybdenum different from the at least one molybdenum source (II), wherein said source of molybdenum (II) is more soluble than said another source of molybdenum (III)(b) in water at 25° C.

48. The fertilizer composition of claim 47, wherein said at least one source of molybdenum (II) is selected from the group consisting of sodium molybdate, ammonium heptamolybdate, potassium molybdate, ammonium molybdate tetrahydrate, and mixtures thereof and wherein said source of molybdenum (III)(b) is selected from the group consisting of molybdenum trioxide, powellite, molybdenum dioxide, and mixtures thereof.

49. The fertilizer composition of claim 47, wherein said composition comprises said another source of calcium (III)(a) and wherein said another source of calcium (III)(a) is water soluble and has a lower pKa than said at least one source of calcium (I) and at least 50% of said particles of each of (I), (II), (III)(a), and (III)(b), when (III)(b) is present, have an average particle size in the range of from about 25 microns to about 170 microns.

50. The fertilizer composition of claim 47, wherein the fertilizer composition further comprises a third source of molybdenum different from the at least one source of molybdenum (II) and different from the another source of molybdenum (III)(b).

51. A coated fertilizer product comprising a carrier coated with the fertilizer composition of claim 47.

52. A fertilizer composition comprising a mixture of:
(I) at least one source of calcium;
(II) at least one source of molybdenum; and
(III)(a) another source of calcium different from the at least one source of calcium (I), wherein said another source of calcium (III)(a) is water soluble and has a lower pKa than said at least one source of calcium (I); and
(b) another source of molybdenum different from the at least one molybdenum source (II), wherein said source of molybdenum (II) is more soluble than said another source of molybdenum (III)(b) in water at 25° C., wherein at least 50% of the particles of each of (I), (II), (III)(a), and (III)(b), when (III)(b) is present, have an average particle size in the range of from about 25 microns to about 170 microns.

* * * * *